United States Patent [19]

Garcon

[11] Patent Number: 5,044,708
[45] Date of Patent: Sep. 3, 1991

[54] WIDE VISUAL FIELD HOLOGRAM

[76] Inventor: Thierry Garcon, 1, Boulevard de la République, Eaubonne, 95600, Val D3 Oise, France

[21] Appl. No.: 477,808
[22] PCT Filed: Jun. 20, 1989
[86] PCT No.: PCT/FR89/00315
  § 371 Date: Apr. 6, 1990
  § 102(e) Date: Apr. 6, 1990
[87] PCT Pub. No.: WO89/12851
  PCT Pub. Date: Dec. 28, 1989

[30] Foreign Application Priority Data
Jun. 20, 1988 [FR] France ................ 88 08211

[51] Int. Cl.⁵ .............. G03H 1/20; G03H 1/22
[52] U.S. Cl. .................. 359/8; 359/12; 359/33; 359/900
[58] Field of Search ........... 350/3.65, 3.69, 3.77, 350/3.85, 3.86, 320

[56] References Cited

U.S. PATENT DOCUMENTS

| | | | |
|---|---|---|---|
| 3,944,322 | 3/1976 | Benton | 350/3.85 |
| 3,947,085 | 3/1976 | Mottier | 350/3.69 |
| 4,339,168 | 7/1982 | Haines | 350/3.69 |
| 4,832,424 | 5/1989 | McGrew | 350/3.65 |
| 4,834,476 | 5/1989 | Benton | 350/3.86 |
| 4,925,260 | 5/1990 | Fisher et al. | 350/3.85 |
| 4,988,154 | 1/1991 | Hansen | 350/3.86 |
| 4,989,929 | 2/1991 | Dausmann et al. | 350/3.69 |

FOREIGN PATENT DOCUMENTS

0107362 5/1984 European Pat. Off.

OTHER PUBLICATIONS

Optical Soc.Am., vol. 56, No. 4, Apr. 1966, E. P. Supertzi et al.: Wide-Angle Holography, pp. 524, 525.
Applied Physics Letters, vol. 8, No. 6, 15 Mar. 1966, F. B. Rotz et al.: "Holograms with Nonpseudoscopic Real Images", pp. 146–148.
Proceedings Intern. Soc. for Optical Engineering, SPIE 761,1987, SPIE (Washington, U.S.), S. A. Benton: "Alcove" Holograms for Computer-Aided Design, pp. 53–61.

*Primary Examiner*—Paul M. Dzierzynski
*Assistant Examiner*—Martin Lerner
*Attorney, Agent, or Firm*—Cushman, Darby & Cushman

[57] ABSTRACT

Process for producing a hologram reproducing the image of at least one object. Said process is characterized in that a first recording is made of the image of said object on at least one first holographic recording material in order to obtain a holographic image of said object, followed by developing this first holographic recording material, making a second recording from said holographic image on a second holographic recording material shaped to present at least one concave part turned towards the first holographic recording material, whereby at least one part of said image must be located in the space defined by the two holographic recording materials. The first and second holographic recording materials are combined in such a way that the distance separating them during the second recording is variable. Said second holographic recording material is developed and then used in the same configuration in order to play back the image of the object.

10 Claims, 6 Drawing Sheets

WIDE VISUAL FIELD HOLOGRAM

The invention relates to holography and makes it possible to obtain particularly attractive representations, both because of the exceptional quality of the impression of relief obtained, and because of it has a particularly wide visual field.

A hologram is a recording, on a holographic recording material, of rays of light reflected by an object illuminated by coherent light.

Upon its reconstruction, by observing the holographic recording material illuminated in the way it was illuminated at the time of recording, the observer then sees the representation in relief of the object, in the region where it was located relative to the holographic recording material when it was recorded.

Depending on whether the ray of light reflected by the object and the ray of light directly illuminating the holographic recording material arrive at this material on the same side or on two opposed sides, the hologram is a transmission hologram or a reflection hologram.

At the time of the reconstruction, the observed image is called "real" when the observer perceives it in front (or on the near side) of the holographic recording material, and "virtual" when the observer perceives it behind (or on the far side of) the holographic recording material.

The space in which the real images appear is accessible to observers, who are able to place their hand where the image is located—an almost supernatural sensation. Contrarily, the space in which the virtual images appear is inaccessible, because it is located behind the holographic recording material, and obviously one's hand cannot pass through that.

Of course, there are also images that have both a real portion and a virtual portion, which is highly favorable to the effect of depth of field; the image of the object represented is thus particularly spectacular when the object itself has an elongated shape, such as the hull of a boat seen from the bow.

Furthermore, the term "orthoscopic images" is used for real or virtual images that reconstruct a normal relief, while "pseudoscopic images" are the real or virtual images that reconstruct a inverted relief: The convex portions at the time of recording are reconstructed as concave, and vice versa. A pseudoscopic image of a statuette, for example, would give the observer the impression at the time of reconstruction that he is looking at an open mold. Because it is contrary to nature, this makes an irritating visual impression.

To make a hologram, two operations are necessary; for good understanding of the invention they must be clearly distinguished from one another, even though they are actually inseparable, since they are both indispensible and they cooperate in producing to the final effect. The first is recording onto the holographic recording material, and the second is reconstruction, in order to present the holographic recording material, suitably illuminated, to an observer.

The quality of the reconstruction clearly depends on the quality of the recording, but to give an observer a strong sensation of reality, one essential condition is the span of the field of vision, in other words the value of the angle within which one or more observers must be located to perceive all the portions of the reconstructed image in relief. The field of vision is accordingly involved in the reconstruction, but not in the recording.

Nevertheless, the very nature of holograms means that both recording and reconstruction are highly intimately dependent on one another.

For example, in classical photography it is possible to take an image 24×36 mm in size and make copies in quite different sizes (up to 4×3 m for posters); in holography, this is impossible, because reconstruction can be done only on the same scale as recording.

Research into quality has therefore studied the operations of both recording and reconstruction.

E. P. Supertzi et al, in the article, "Wide-angle holography", in JOURNAL OPTICAL SOC. AM., Vol. 56, No. 4, April 1966, pp. 524–525, described a process with which the field of vision can be enlarged upon reconstruction of holographic images by using a curved holographic recording material at the time of the recording.

However, this process makes it possible to obtain only virtual images, the above-described disadvantages of which disqualify them, if one seeks to obtain high-quality holograms.

European Patent A 0 107 362 describes a process that uses a cylindrical mirror to obtain a real image located in a space defined by a curved holographic recording material, but this image is pseudoscopic; consequently, this version must also be rejected.

This process has the further disadvantage of producing only real images, with no virtual portion at all, so they have no depth of field.

F. B. Rotz et al. in an article entitled "Holograms with nonpseudoscopic real images", in Applied Physics Letters, Vol. 8, No. 6, Mar. 15, 1966. pp. 146–148, describe a process for making a flat hologram with an orthoscopic, at least partially real image of the subject, which is initially recorded on a first "hologram to be transferred" (or "transferred hologram"), or "primary hologram", which is then reproduced holographically on a second hologram, called a "transfer hologram" or "secondary hologram".

One disadvantage of this process is that it is not possible to have a wide visual field, of 180°, for example, on a real orthoscopic image because the holographic recording material of the final hologram is flat. Moreover, to enlarge the field of vision of a real orthoscopic image that is defined by the edges of the flat holographic recording material, it is necessary at the time of the recording either to enlarge the size of the holographic recording material or to decrease the distance between the reconstructed image and the holographic recording material, which in turn decreases the prominence of the image.

The invention proposes a novel solution that is entirely different from the teaching of the prior art, because this solution makes it possible to obtain holograms that reconstruct either completely real or partly real and partly visual images that are always orthoscopic, and with a wide field of vision.

With a wide field of vision, the blind angles from which the reconstructed images can no longer be seen can be diminished or even completely eliminated.

This offers several simultaneous possibilities:

A single observer can see the reconstructed images for a relatively long time if he moves with respect to them. It now becomes possible to place holograms with real orthoscopic images in passageways while being assured that they will be seen.

A single observer can perceive the reconstructed images from one position among many others and can make a veritable exploration of the object represented, over a major portion of its perimeter.

Several persons can observe the reconstructed images at the same time. The wider the field of vision, the greater the number of persons can be.

To this end, the subject of the invention is a process for making a hologram that reconstructs an image of at least one object, characterized in that a first recording of the image of the object is made on at least one first holographic recording material in order to obtain a holographic image of the object, and then a development of this first holographic recording material is performed, then a second recording is made from the holographic image onto a second holographic recording material arranged to present at least one concave portion oriented toward the first holographic recording material, at least a portion of this image being located in the space defined by the two holographic recording materials; that the first and the second holographic recording materials are associated in such a manner that the distance separating them at the time of the second recording is variable, and then a development of this second holographic recording material is performed, then the second holographic recording material is used in accordance with the same configuration to reconstruct the image of the object.

In other characteristics of this process:
the first holographic recording material is flat;
the first holographic recording material has a concavity that must be oriented toward the second holographic recording material;
the first holographic recording material has a convexity that must be oriented toward the second holographic recording material;
at the time of the second recording, the second holographic recording material has at least one edge close to one edge of the first holographic recording material;
at the time of the second recording, the second holographic recording material, which is flat in its natural state, is arranged to have at least one curved portion;
at the time of the second recording, the second holographic recording material, which is flat in its natural state, is arranged in a circular arc.

The invention also relates to a hologram made by employing the above process, characterized in that it includes a recording holographic recording material and a substantially rigid substrate for keeping the holographic recording material in a form having at least one concave portion in the direction of a zone of the space in which observers are to be located; illuminating means of a known type are optionally associated with the substrate.

In other characteristics of the above-defined hologram:
the concave portion is curved;
the holographic recording material is entirely concave and curved.

The invention will be better understood by the ensuing detailed description made with reference to the accompanying drawing. It is understood that the description and the drawing are given solely by way of illustrative and non-limiting example.

Figure 1:
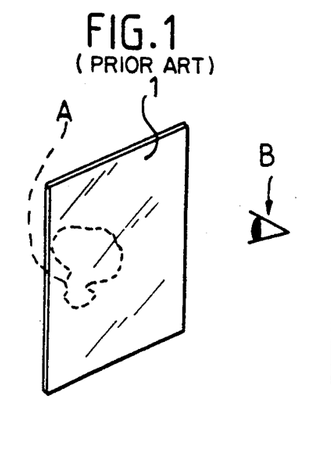
FIGS. 1, 2 and 3 are schematic perspective views showing the arrangements known from the prior art, in three main variants.
Figure 6:
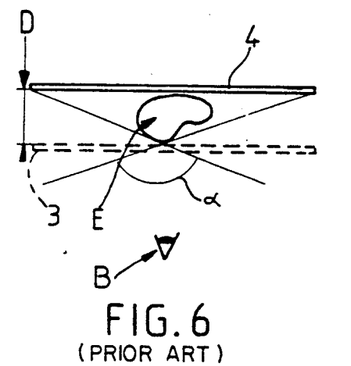

Turning now to FIGS. 1 and 6, arrangements are seen in accordance with the known prior art.

In FIGS. 1-4 and 2-5, two holograms are seen that have virtual images upon reconstruction; that is, they appear behind the holographic recording material. That of FIGS. 1 and 4, which is the simplest, includes a holographic recording material 1 that is flat. The virtual image A can be seen from only a narrow angle of vision α. So that it will be as wide as possible, it is provided that the virtual image A is located practically in contact with the recording material 1. Thus an observer B who would move with respect to the plane of the recording material 1 would still see the various points of the image A in contact with the recording material 1.

Figure 2:
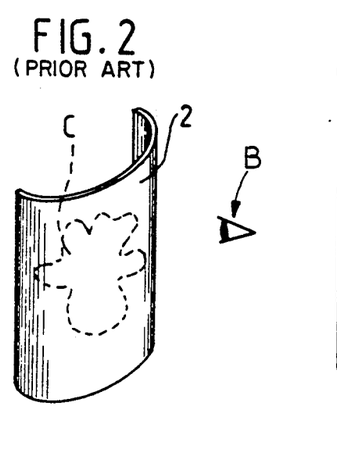
Figure 5:
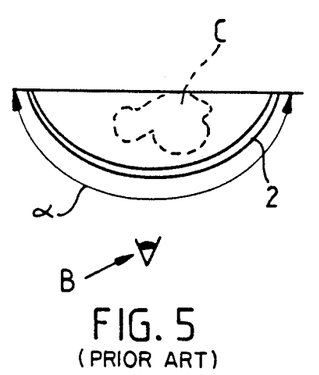

The image of FIGS. 2 and 5 constitutes an improvement over the preceding one, because the holographic recording material 2 is curved. Thus the observer B can see the entire image A (from various points of view) along an angle of vision α of 180°, instead of several degrees as in FIG. 1.

Figure 3:
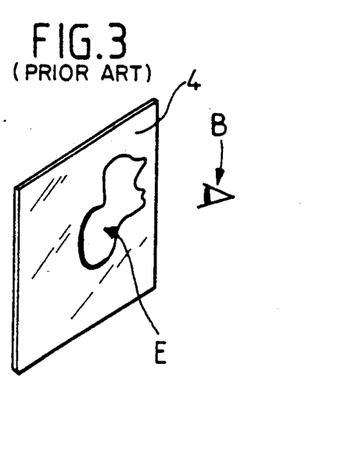
Figure 4:
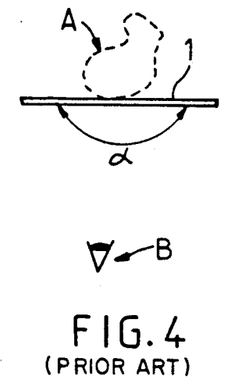
FIGS. 4, 5 and 6, with respect to the foregoing drawings, are a schematic illustration of the fields of vision that these known arrangements obtain at the time of the reconstruction of a hologram.

In FIGS. 3 and 6, the employment of several operations is assumed:

First, an object has been recorded on a first flat holographic recording material 3, which has created an image. Then, the image is rerecorded onto a second flat holographic recording material 4, at a distance D, to obtain an image A, which upon observation under ad-hoc illumination, is on the one hand real, because it is located between the observer B and the holographic recording material 4, and on the other hand orthoscopic, because it reconstructs the impression of true relief rather than inverted relief.

If the observer B moves transversely, he can see the most prominent portions of the real orthoscopic image A along a field of view α that cannot attain 180°.

This is a "transfer hologram", and it can be seen that the distance D is determining for the width of the field of vision α. The greater the distance D, the greater the prominence of the image E and the narrower the field of vision α. If it were desired that it be wider, it would be necessary to shorten the distance D and hence to reduce the prominence of the image E, possibly even by converting some of the image portions that would have been real into virtual ones, because they would shift to behind the recording material 4.

FIGS. 2 and 5 illustrate the solution proposed by the article in JOURNAL OPTICAL SOC. AM. discussed above. The observer B is located on the convex side of a curved holographic recording material 2 and observes a virtual image C through this surface 2.

FIGS. 3 and 6 show the solution proposed by the article in Applied Physics Letters discussed above.

Figure 7:
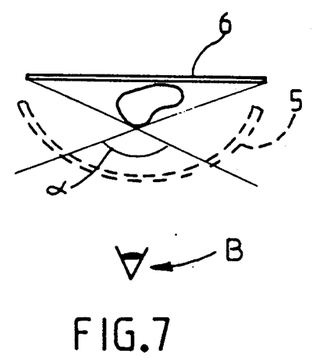
FIGS. 7 and 8 are arrangements showing two possible variants, combining the provisions of FIGS. 2-5 and 3-6.
Figure 8:
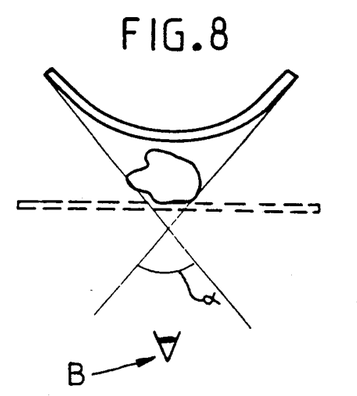

FIGS. 7 and 8 are theoretical arrangements that show what combining the solutions of FIGS. 2-5 and 3-6 might produce.

In FIG. 7, the primary 5 is curved and the secondary 6 is flat. An image of type E is obtained, but it is observed via its portion that corresponds to that of the object closest to the concavity of the primary 5. Hence the field of vision is quite limited, as in the case of FIGS. 3 and 6, because the article cited teaches nothing that would enable widening the field of vision.

Figures 9, 10, 11, 12:
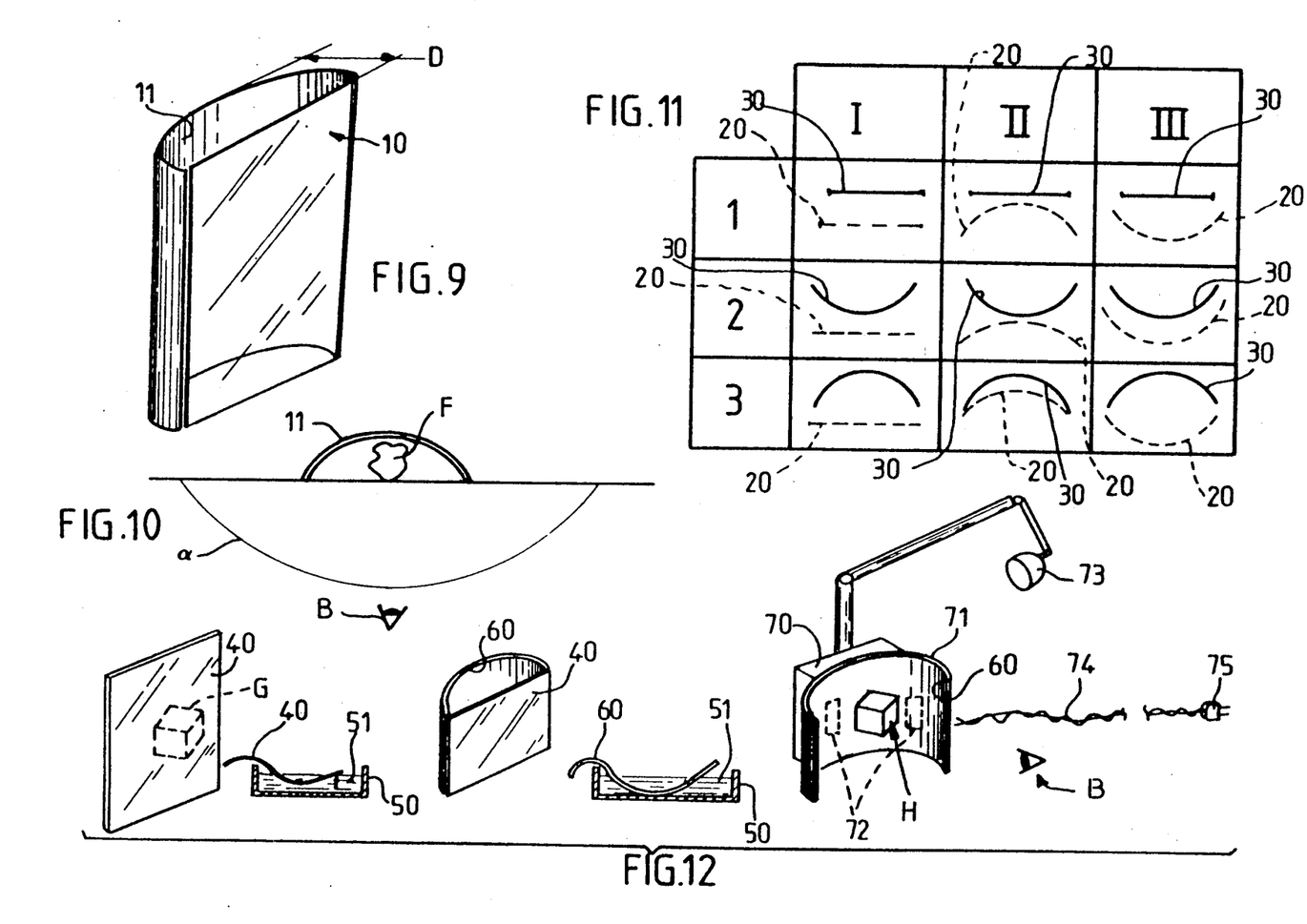
FIG. 9 is a schematic view showing the provisions of the present invention at the time of the transfer operation.
FIG. 10, with respect to FIG. 9, is a schematic illustration of the field of vision that the invention obtains at the time of reconstruction of a hologram.
FIG. 11 is a table grouping together the arrangements for various possible variants; line 3 shows the essential variants of the invention.
FIG. 12 is a general diagram illustrating the process according to the invention.

The invention is a complete departure from the prior art solutions, as the arrangement of FIGS. 9 and 10 shows.

According to the invention, a primary is made on a first flat holographic recording material 10, and then the image obtained is transferred to a (secondary) holographic recording material 11 which has a concavity that at the time of the transfer is oriented toward the primary.

The arrangement of FIG. 10 shows the situation of the secondary 11 at the time of the reconstruction.

It is clear at the outset that one is in the presence of an image F which is real and orthoscopic. It is located in the space defined by the edges of the concavity of the secondary 11, by the distance D. On the other hand, if the primary 10 is not very close, or in other words if it is not practically in contact with the lateral edges of the secondary 11, then blind angles are created; the importance that they can nevertheless have will be explained hereinafter.

FIG. 11 is a table showing all the arrangements for transfer between flat, convex and concave holograms.

Column I groups the arrangements in which the primary is flat. Column II groups the arrangements in which the primary is concave, and column III groups the arrangements in which the primary 20 is convex.

Line 1 groups the arrangements in which the secondary 30 is flat. Line 2 groups the arrangements in which the secondary 30 is convex, and line 3 groups the arrangements in which the secondary 30 is concave.

Among the prior art documents mentioned above, only that of FIGS. 3 and 6 provides a transfer hologram. It corresponds to the case I-1. The theoretical combinations represented in FIGS. 7 and 8 correspond to the cases III-1 and I-2.

The solutions can be summarized as follows:

Case I-1: no curvature of the primary, no wide field of vision.
Case II-1: no wide field of vision.
Case III-1: no wide field of vision.
Case I-2: no wide field of vision.
Case II-2: no wide field of vision.
Case III-2: field of vision even narrower than with the arrangement of case III-1.
Case I-3: solution of the invention. The field of vision can be 180° over a portion of the image quite close to the primary, when the primary and the secondary have their edges joined at the time of transfer.
Case II-3: solution of the invention. This arrangement makes it possible to use a laser with a slight coherent length and hence is inexpensive for the recording. On the other hand, the distance D is relatively short and tends to narrow the field of vision.
Case III-3: solution of the invention. The field of vision can be 180° when the image is located in a plane passing along the edges of the primary and the edges of the secondary. The primary and the secondary can have their edges joined at the time of transfer.

FIG. 12 schematically illustrates the process according to the invention.

An object G is first recorded on a first holographic recording material 40 (primary), which here is shown in flat form.

This surface 40 is subjected to developing operations known per se, as symbolically represented by a tank 50 containing a liquid 51.

After development, one proceeds to the recording of its holographic image onto a second holographic recording material 60, which is kept in a configuration in which it presents a concave portion toward the primary 40.

It is subjected to development operations known per se, as symbolically represented by a tank 50 containing a liquid 51.

With a view to the reconstruction of the holographic image of the object G, the surface 60 is associated with a substrate 70 that is sufficiently rigid and solid to keep this surface 60 in the same configuration that it had at the time of the second recording (recording of the secondary).

To do this, a frame, profile sections or any other structure 71 can be used that advantageously contains fixation means, for example detachable ones, such as metal parts 72 that are to be located facing permanent magnets (not visible in the drawing) solidly attached to the substrate 70.

The substrate 70 is advantageously associated with a light fixture 73 that can be aimed, so that in all places it is capable of aiming the beams of light issuing from in a direction coordinated with that of the illumination selected at the time of the recording of the secondary.

An electrical cord 74 and a plug 75 enable connection with a conventional electrical system.

It is noted that the concavity of the secondary 60 is oriented toward the primary 40 at the time of the recording, and toward the observer B at the time of the reconstruction. This three-dimensional concave form of the holographic recording material of the secondary 60 makes it possible, by comparison with a conventional flat transfer hologram, to enlarge the field of vision of its real orthoscopic image, without having to either enlarge its size or regionally reduce the distance of the images from the holographic recording material.

Thus the field of vision can be enlarged on a horizontal, vertical or oblique plane.

Figure 13:
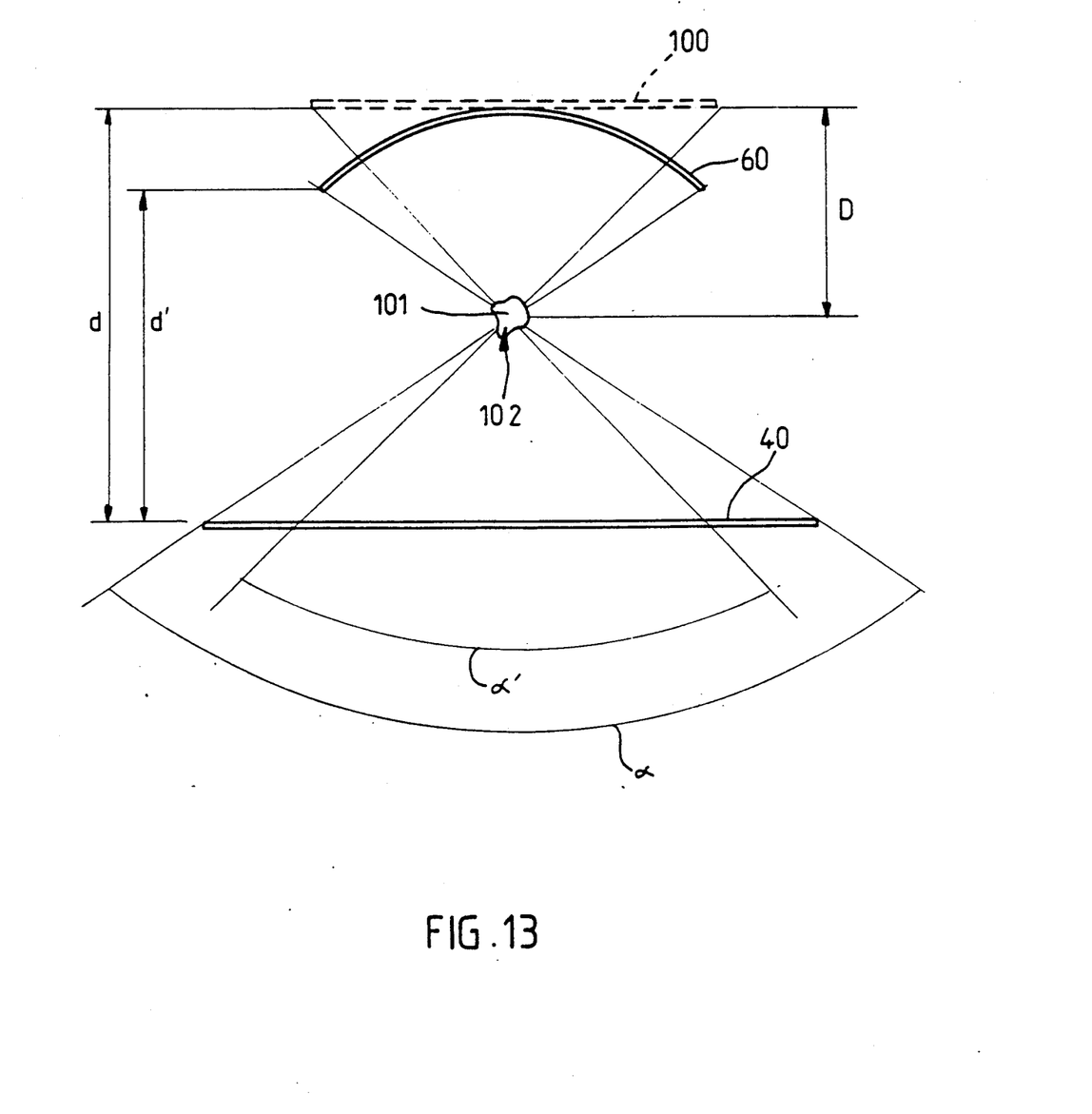
FIGS. 13-16 are possible arrangements for the recording, transfer and reconstruction of holograms in accordance with the present invention.

Turning now to FIG. 13, it is seen that by superposition it can be confirmed that a flat transfer hologram 100, located at the same distance D from a point 101 of the transferred image 102 would makes it possible to obtain only a field of vision α' smaller than the field of vision α obtained in accordance with the invention with a concave secondary 60.

With this circular arc form, the distance between each point of the image and the hologram 60 is constant, since the image is located practically at the center of the circular arc. On the other hand, the distance measured perpendicularly from the transfer hologram 40 is variable between the values d and d'.

Figure 14:
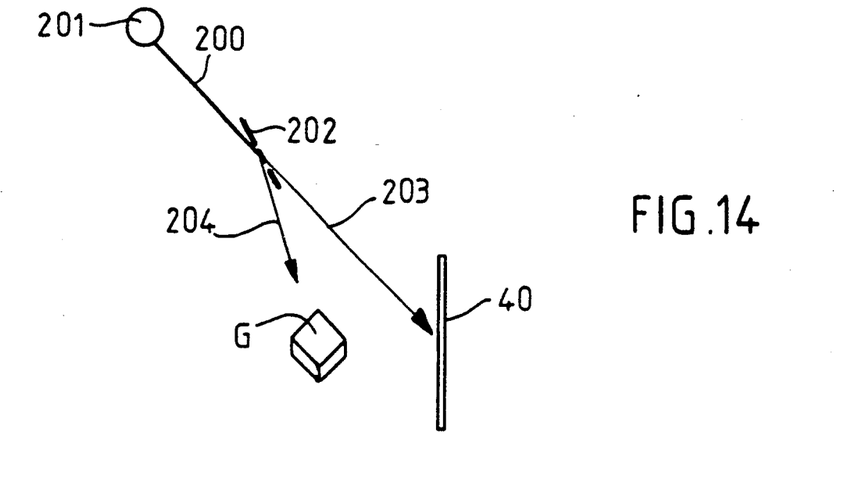

FIG. 14 is a schematic plan view of the process of recording on a first flat hologram 40 of the image of an object G, with the aid of a beam 200 originating in a coherent source 201. A semitransparent mirror 202 splits the beam 200 in two to obtain a "reference beam" 203 and a "object beam" 204.

With this known configuration, the hologram 40 is said to be restorable by transmission.

Figure 15:
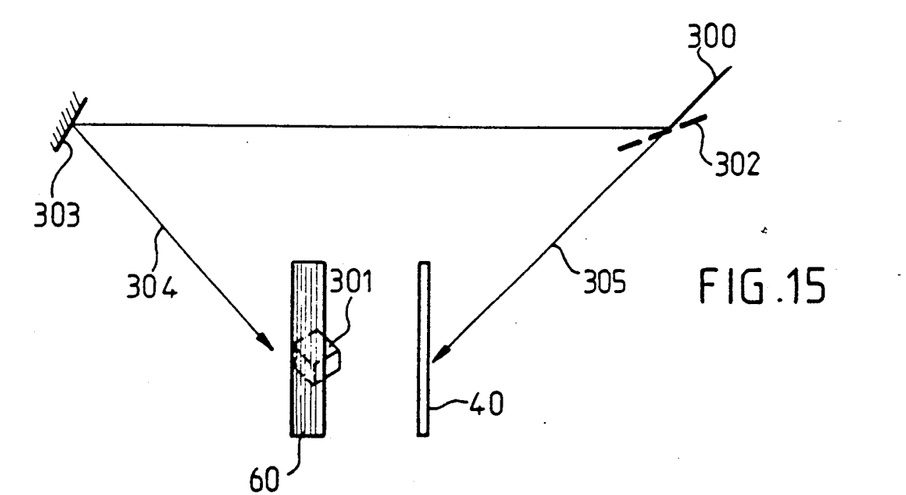

FIG. 15 is a schematic elevation view of the transfer technique, according to the invention, of the flat primary 40 onto the concave secondary 60.

A beam 300 originating in a coherent source and split in two by a semitransparent mirror 302 to obtain an "object beam 305" and, by reflection at the mirror 303, "a reference beam" 304.

The beam 305 reconstructs the primary 40, which gives a real pseudoscopic image 301 of the object G.

Figure 16:
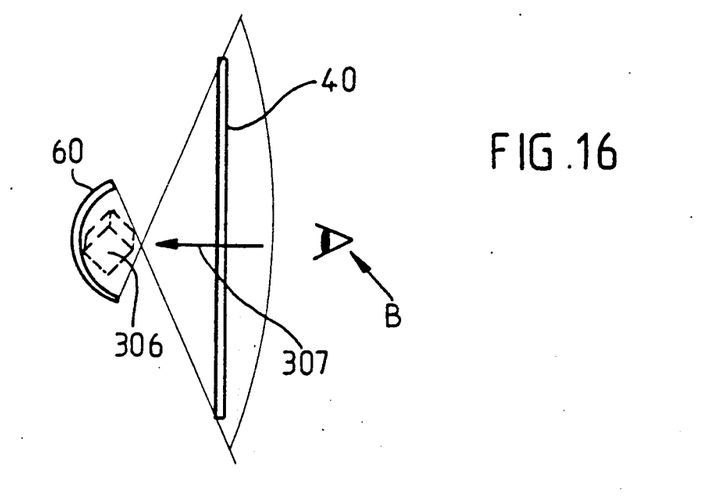

FIG. 16 is a plan view of an observer B looking at the real orthoscopic image 306 of the object G of the concave secondary 60, as he would see it through the flat primary 40. The secondary 60 is reconstructed with a reconstruction beam 307 which may have a spectral composition and a variable coherence. In this case, for better confirmation of an enlargement of the field of the vision at the real orthoscopic image, the primary 40 must be large enough to obstruct the field of vision onto the image 306 as little as possible.

Figure 17:
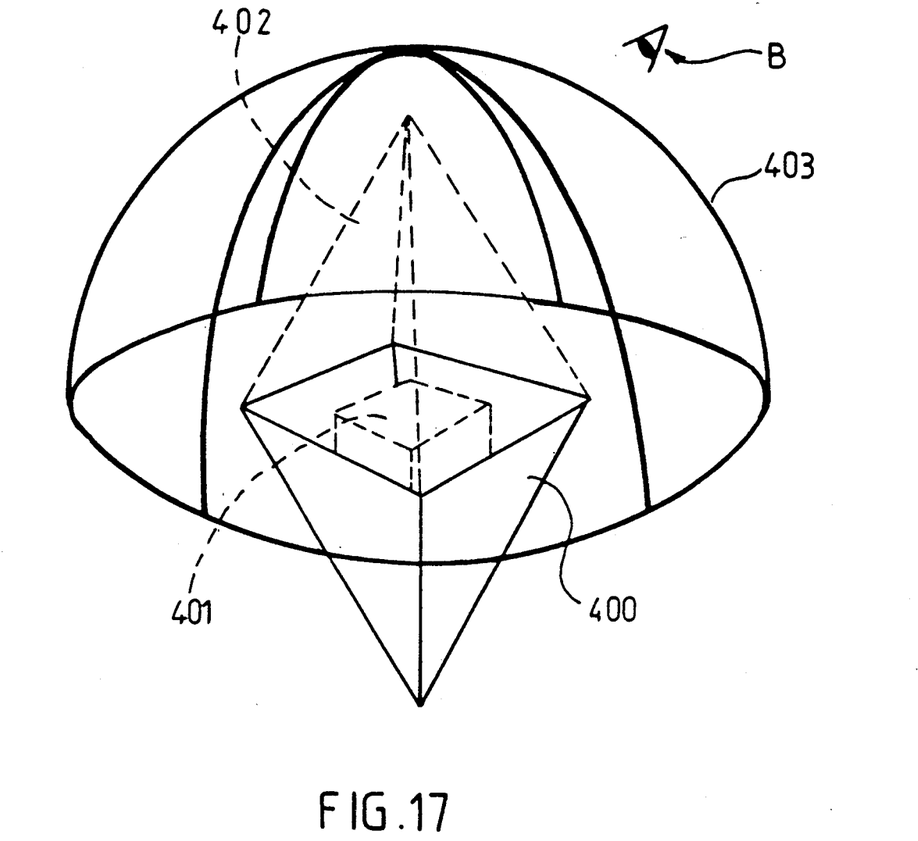
FIG. 17 is a schematic perspective view of a particular embodiment of the invention at the time of the reconstruction of a hologram.

FIG. 17 is a schematic perspective view of the possibilities of the invention.

A concave hologram 400 that is shown here in pyramid form but could also be conical reconstructs a suitably positioned real orthoscopic image 401. This image 401 originates from a transferred hologram 402 corresponding in shape to that of the hologram 400.

In this case, the real orthoscopic image 401 can be observed from a hemispherical visual area 403.

If the dimensions of the holograms 400 and 402 are adequate, it can be provided that the observer can penetrate them in order to visualize the image 401.

The final hologram can be recorded in such a manner that it can be reconstructed by transmission and/or by reflection.

The hologram to be transferred can be reconstructed by reflection. It may have a flat surface or a symmetrical or irregular threedimensional shape as needed. It may be replaced with a hologram multiplexed via tapes, or by a hologram produced by the stamping technique.

The final hologram can simultaneously or separately record several holograms, which can be added to physical objects. It can have more than one angle of reconstruction and can be superimposed on other holograms by using their property of transparency.

This final hologram can be the result of a plurality of hologram transfers.

These holograms can be made on any holographic recording materials capable of having such three-dimensional shapes and being sensitive to the usable wavelengths, examples being flexible silver halide halographic films.

Figure 18:
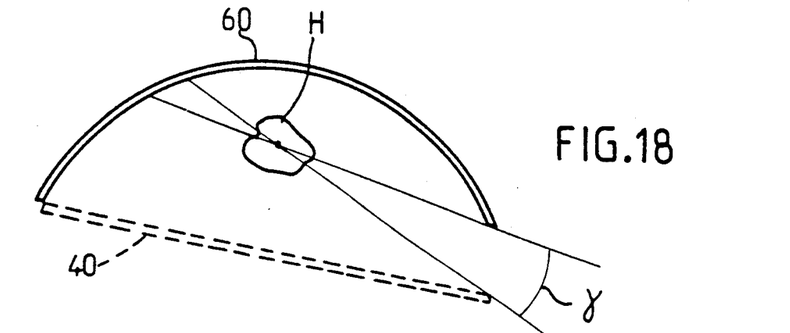
FIGS. 18 and 19 are schematic views showing the presence of blind angles making it possible to create special effects at the time of the reconstruction.

Thus FIG. 18 shows the flat primary 40 and the concave secondary 60 at the time of transfer, having only a single joined edge.

With respect to the center of the image H, an observer does not see the point of view of this image H when it is located in the blind angle γ.

This arrangement makes it possible to create special effects in the appearance and disappearance of the image when the observer moves. As indicated above and as will be apparent in cases I-3, II-3 and III-3 of the table in FIG. 11, the primary 40 of the invention may be either flat, concave or convex.

Figures 19, 20, 21, 22, 23, 24:
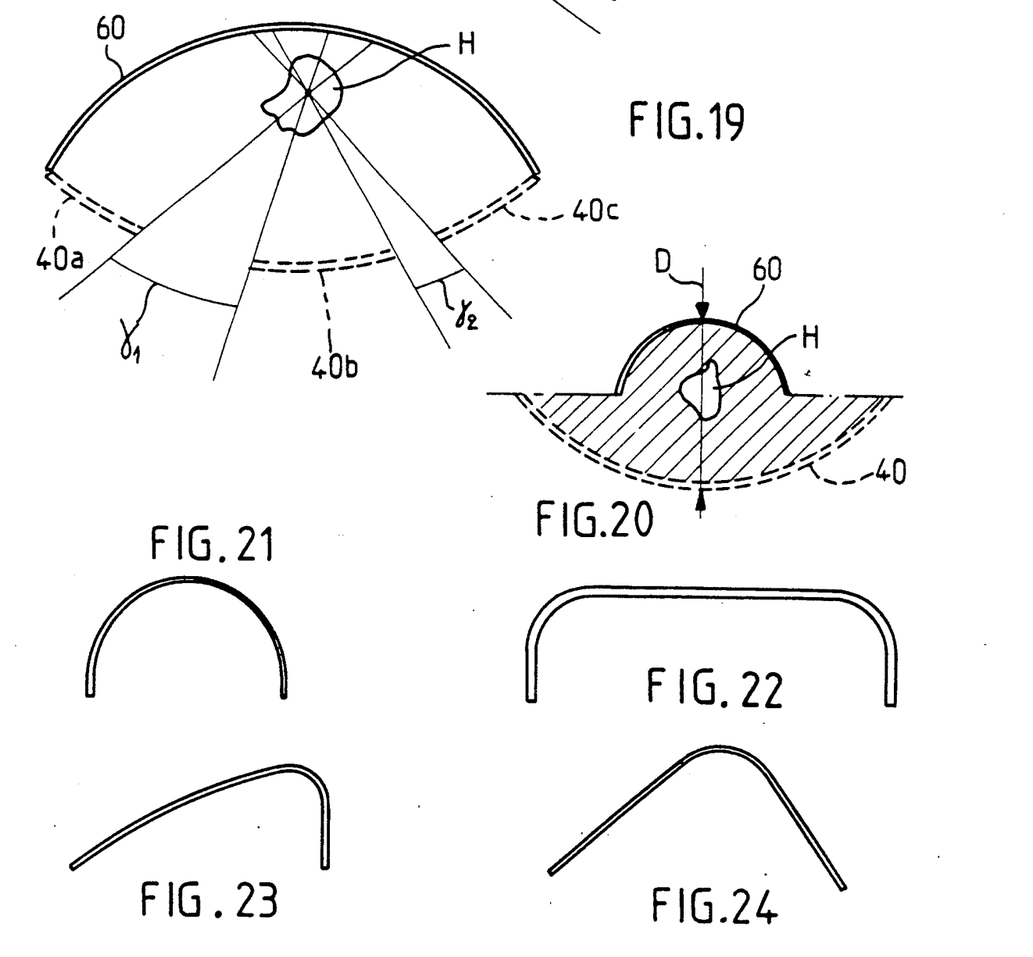
FIG. 20 is a schematic view showing how the space in which the image or images, or optionally objects, must be located at the time of transfer in order to obtain real images at the time of the reconstruction.
FIGS. 21-25 are diagrams illustrating several possible forms for restoring holograms according to the invention.
Figure 25:
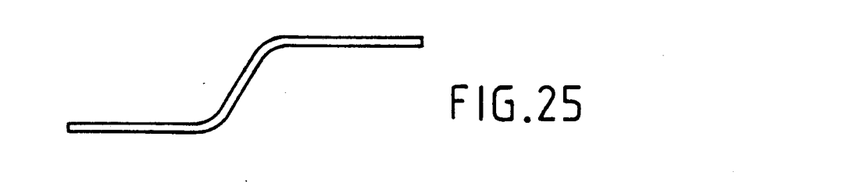

In FIG. 19, the case has been shown where three primaries 40a, 40b and 40c are used. It may be the same hologram fragmented, cooperating to create the same image H, or three separate holograms producing three different images.

Each of these is plane, concave or convex. Here they are separated by two spaces creating two blind angles γ1 and β2 which cause the corresponding points of view of the image H to disappear for an observer located in these angles. This makes it possible to create special effects with the appearance and disappearance of one or more separate, different, complementary, or grouped images, etc.

Since the important factor here is to create the blind angles, it is also possible to cut a hologram or to place opaque masks on it.

The holograms 40a, 40b and 40c can be plane, concave, or convex and may be arranged in a straight, curved or broken line.

The holograms 40a and 40c here each have one edge adjacent to one edge of the concave secondary 60 to cancel any lateral blind angle.

This has the advantage of an angle of vision spread over 180° and affords the option of creating special effects.

In FIG. 20, a shaded space is shown that exists between the primary 40 and the concave secondary 60, where the real image H may be located at the time of the reconstruction.

FIGS. 21–25 show various forms that can be given to the holographic recording materials, depending on certain optical effects one wishes to obtain.

By associating concave portions and flat and/or convex portions, holograms can be located within a veritable decorating scheme that can further reinforce their attractive effect.

The transfer hologram may be copied by the stamping technique or by the technique of coherent light holography.

At the time of recording and reconstruction, it may have a surface of symmetrical or irregular three-dimensional shape, having at least one reinforcement of variable depth at one or more re-entrant angles.

At the time of the transfer, the concavity formed by the curvature of the transfer hologram is oriented toward part or all of the real pseudoscopic image of the hologram to be transferred. Thus the distance between the various holograms is variable. When these holograms are locally quite close or even in contact, it is possible to use a single coherent light beam, for example in flat waves, to reconstruct and record the various holograms at the time of the transfer.

When the concavities are quite pronounced, special optics such as conical optics and/or special holographic optical elements must be used, to enable recording and restoring them suitably.

It is obligatory that the various holograms have precisely the same shape of holographic recording material at the time of reconstruction as they had at the time of the recording.

The holographed subjects may be numbers or letters, parts of machines and mechanisms, drawings, photographs, works of art or their copies, or any other physical object in nature of human activity.

The invention can be used particularly in spatial image separation, for information storage systems, for realizing and reproducing copies of works of art, for constructing artistic panoramas, for recording holographic portraits, for producing educational materials, exhibits and souvenirs, and in advertising and communications.

To obtain an angle of vision of 180°, the holographic image must at the moment of the transfer be located in the space that exists between the primary 40 and the concave secondary 60.

When the primary 40 is flat and has its edges joined to those of the concavity of the secondary 60, the space is defined by the concavity and the primary (this configuration is visible in FIG. 9).

Other configurations are also possible, however; FIG. 20 shows one in which the primary 40 is convex. The space in which the image or images must be located is indicated by shading, and it can be seen that this space is defined by the holographic recording materials themselves and by the imaginary planes P that join the edges of the primary and the secondary, when they are not in contact, contrary to the case of FIG. 9.

FIGS. 21-25 show various forms that the secondary can be given, as a function of certain optical effects one wishes to obtain.

By associating concave portions and flat and/or convex portions, the holograms can be located in veritable decorating schemes that can further reinforce their attractive effect.

In particular, at the time of the transfer of the primary to the secondary, real objects can be placed between them, the image of which will be recorded at the same time as the image of the primary.

I claim:

1. A process for making a hologram restoring an image of at least one object, characterized in that a first recording of the image of said object is made on at least one first holographic recording material with a view to obtaining a holographic image of said object; then a development of this first holographic recording material is made; then a second recording is made from said holographic image on a second holographic recording material arranged to have at least one concave portion oriented toward the first holographic recording material, at least a portion of this image having to be located between the space defined by the two holographic recording materials; that the first and the second holographic recording material are associated in such a manner that the distance separating them at the time of the second recording is variable; then a development of this second holographic recording material is performed; then the second holographic recording material is used in accordance with the same configuration to reconstruct the image of the object.

2. The process according to claim 1, characterized in that the first holographic recording material is flat.

3. The process according to claim 1, characterized in that the first holographic recording material has a concavity that must be oriented toward the second holographic recording material.

4. The process according to claim 1, characterized in that the first holographic recording material has a convexity that must be oriented toward the second holographic recording material.

5. The process according to claim 1, characterized in that at the time of the second recording, the second holographic recording material has at least one edge close to one edge of the first holographic recording material.

6. The process according to claim 1, characterized in that at the time of the second recording, the second holographic recording material, which is flat in the natural state, is configured to have at least one curved portion.

7. The process according to claim 6, characterized in that the time of the second recording, the second holographic recording material, which is flat in the natural state, is configured as a circular arc.

8. A hologram obtained by performing the process of claim 1, characterized in that it includes a recorded holographic recording material and a substantially rigid substrate for keeping said recorded holographic recording material in a form that has at least one concave portion in the direction of a zone of the space in which observers are to be located, illuminating means of a known type being optionally associated with said substrate.

9. The hologram according to clam 8, characterized in that the concave portion is curved.

10. The hologram according to claim 8, characterized in that the recorded holographic recording material is entirely concave and curved.

* * * * *